(No Model.)

2 Sheets—Sheet 1.

O. R. CHASE.
MACHINE FOR WORKING CONFECTIONERY.

No. 441,640.

Patented Dec. 2, 1890.

Witnesses:
F. Howard Chase
Walter E. Lombard.

Inventor:
Oliver R. Chase,
by N. C. Lombard
Attorney.

(No Model.) 2 Sheets—Sheet 2.
O. R. CHASE.
MACHINE FOR WORKING CONFECTIONERY.
No. 441,640. Patented Dec. 2, 1890.
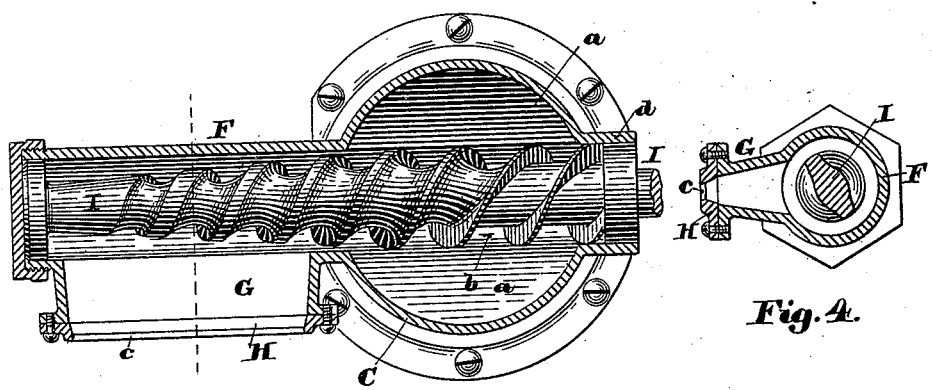
Fig. 4.
Fig. 3.
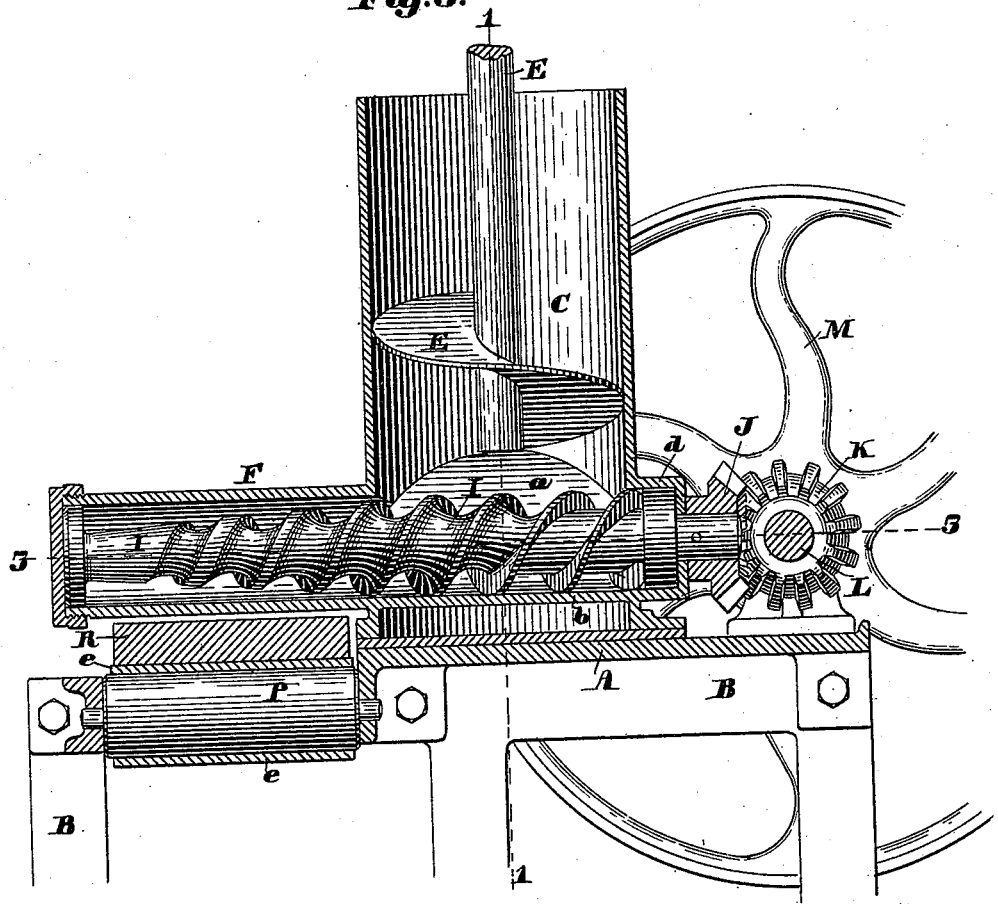
Fig. 2.
Witnesses:
F. Howard Chase.
Walter E. Lombard.
Inventor:
Oliver R. Chase,
by N. C. Lombard
Attorney.

UNITED STATES PATENT OFFICE.

OLIVER R. CHASE, OF BOSTON, MASSACHUSETTS.

MACHINE FOR WORKING CONFECTIONERY.

SPECIFICATION forming part of Letters Patent No. 441,640, dated December 2, 1890.

Application filed December 20, 1888. Renewed October 24, 1890. Serial No. 369,174. (No model.)

*To all whom it may concern:*

Be it known that I, OLIVER R. CHASE, of Boston, in the county of Suffolk and State of Massachusetts, have invented a new and useful Improvement in Machines for Working Confectionery, of which the following, taken in connection with the accompanying drawings, is a specification.

This invention relates to machines for working and forming confectionery and other plastic materials, and has for its object a reduction in the cost of the machine and the power required to operate the same, and a considerable increase in the variety of forms and in the quantity of work that may be performed thereby.

This invention is an improvement upon the machine described in Letters Patent No. 279,132, granted June 12, 1883; and it consists in certain novel features of construction, arrangement, and combination of parts which will be best understood by reference to the description of the drawings and to the claims to be hereinafter given, and in which the invention is clearly pointed out.

Figure 1:
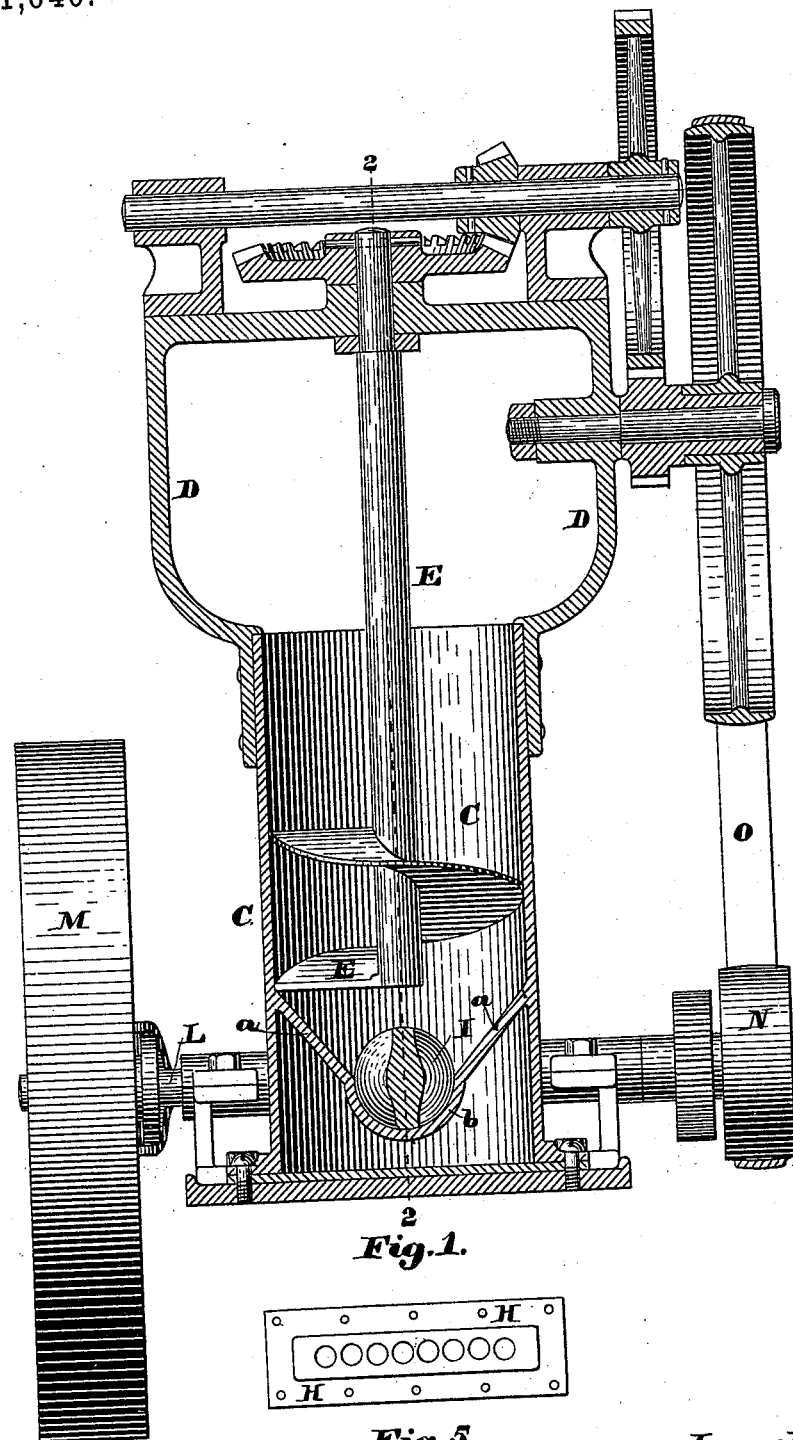
Figure 5:
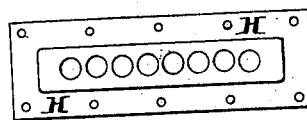

Figure 1 of the drawings is a vertical section of so much of a machine as is necessary to illustrate this invention, the cutting-plane being on line 1 1 on Fig. 2. Fig. 2 is a vertical section on line 2 2 on Fig. 1, but omitting the shafts, gearing, and pulley mounted upon the upper end of the vertical cylinder, and showing the apron and a board for conveying away the discharged confectionery or other material in section and one of the apron-carrying rolls and portions of the supporting-frame in elevation. Fig. 3 is a horizontal section through the horizontal and vertical cylinders or casings on line 3 3 on Fig. 2, and showing the horizontal screw conveyer in plan. Fig. 4 is a transverse section through the discharging cylinder and nozzle, and Fig. 5 is an elevation of a modified form of the discharge-nozzle plate.

In the drawings, A is the bed or table of the machine supported upon a suitable frame B. (Shown only in Fig. 2.)

C is a vertical cylinder secured in a fixed position upon the table A, the upper end of which cylinder is open and has secured thereto the frame D in suitable bearings, in which are mounted the pendent screw conveyer E, and the mechanism for revolving the same, constructed and arranged substantially as shown and described in said before-mentioned Letters Patent.

F is a smaller cylinder projecting from the side of the vertical cylinder C, near its lower end, and having its outer end closed, and provided upon its side, and extending nearly the whole length thereof, with the rectangular discharge-nozzle G, which may be formed in one piece with the cylinder F, as shown; or it may be formed separate therefrom and be secured thereto by screws or by soldering, as may be desired. The lower end of the vertical cylinder is closed by two inclined planes *a a* and a semi-cylinder *b*, corresponding in diameter and axial line with the cylinder F, as shown in Figs. 1 and 2.

The discharge-nozzle G has secured to its outer end the plate H, which may have a single rectangular opening *c* cut through it for the passage of the sugar, paste, or other plastic material when it is desired to discharge the material in the form of a thin sheet; or said plate may have a series of openings of any desired form, as shown in Fig. 5, to be used when it is desired to deliver the material in the form of rods or bars.

I is a screw conveyer mounted in the cylinder F, and having a bearing at one end in the hub *d* on the cylinder C, and at its other end in the outer end of the cylinder F, as shown in Fig. 2.

The screw conveyer I is provided with two wings or a double thread of uniform pitch throughout, and that portion thereof which is under the cylinder C and within the semi-cylinder *b* is of uniform diameter and corresponds to the interior diameter of the cylinder F, while that portion thereof which is within the cylinder F has its thread gradually reduced in diameter from the junction of the cylinders C and F, where its diameter corresponds to the interior diameter of the cylinder F, to the outer end of said cylinder F, where the threads or wings entirely disappear.

The screw conveyer I has mounted upon one end thereof the bevel gear-wheel J, the teeth of which engage with the teeth of a similar gear-wheel K, mounted upon the shaft L, to which a rotary motion is imparted by means of the pulley M and a belt leading therefrom to a counter-shaft or other prime mover. (Not shown.) The shaft L also has mounted thereon the pulley N, from which by means of the belt O motion is imparted to the mechanism for operating the screw conveyer E, substantially as shown and described in the before-cited Letters Patent.

P is one of the rolls for supporting the apron e, arranged with its axis parallel to the axis of the screw I, as shown. The apron e is supported upon a series of rolls similar to P, around which it is moved by means of a belt (not shown) leading from a pulley, (also not shown,) which may be mounted upon the shaft of the screw conveyer I, or on the hub of the gear J, or in any other suitable manner, which, as it forms no part of my present invention, it is not necessary to further describe or show in the drawings.

In the machine described in the before-cited Letters Patent a series of horizontal screws were arranged beneath the vertical screw conveyer, each extending into and revolving in an independent short cylinder provided with a suitable nozzle, from which a round or fluted bar or rod of the plastic material was forced and received upon boards resting upon the moving apron in a well-known manner. This arrangement involved considerable expense in the manufacturing of the machines, and the number of bars or rods that could be simultaneously discharged therefrom was necessarily limited to a comparatively small number.

I have found that with the construction shown and described with only one horizontal screw conveyer, and discharging the material at right angles to the axis of said screw, the machine is much less expensive, less power is required to operate it, and a greater number of bars or rods can be simultaneously discharged therefrom.

A very important feature of this invention is the tapering screw conveyer I, in combination with a cylinder or inclosing casing having a uniform interior diameter, as I have found by actual test that if the screw is made of uniform diameter throughout the material will be fed from the nozzle faster at one end of the discharge-orifice than at its other end, and as a consequence, instead of the material moving away from the nozzle in a straight line in the direction of the movement of the apron e and the receiving-boards R, said material will move in an arc of a circle and very soon be discharged from the side of the receiving-board and apron and fall upon the floor; but by making the screw I tapering, as described, this difficulty is entirely overcome, and the material will be discharged in a straight line and at a uniform speed from all of the orifices when more than one are used.

What I claim as new, and desire to secure by Letters Patent of the United States, is—

1. The combination, in a machine for working plastic material, of a cylinder closed at one end and having an orifice or orifices opening therefrom at right angles to its axis, and a revolving screw conveyer fitted within said cylinder, the threads or wings of which have a diameter at the receiving end of said cylinder corresponding to the interior diameter of said cylinder and gradually tapering and receding from the inner surface thereof, substantially as described.

2. The combination, in a machine for working plastic material, of a vertical cylinder, a revolving screw conveyer working therein, a horizontal cylinder projecting from the side of said vertical cylinder and having its outer end closed, and having a discharge orifice or orifices opening therefrom at right angles to its axis, and a horizontal screw conveyer, arranged beneath said vertical screw conveyer and extending into said horizontal cylinder past said discharge orifice or orifices, and having a diameter across its wings at the receiving end of the said horizontal cylinder substantially equal to the interior diameter of said cylinder, and gradually tapering and receding from the inner surface of said cylinder from that point to its end nearest to the closed end of said horizontal cylinder, substantially as described.

In testimony whereof I have signed my name to this specification, in the presence of two subscribing witnesses, on this 12th day of December, A. D. 1888.

OLIVER R. CHASE.

Witnesses:
N. C. LOMBARD,
WALTER E. LOMBARD.